April 8, 1952   W. H. WANNAMAKER, JR., ET AL   2,592,088
ELECTRIC PROPORTIONING CONTROLLER WITH PNEUMATIC RESET
Filed March 31, 1948                                          4 Sheets-Sheet 2

INVENTORS.
WILLIAM H. WANNAMAKER JR.
BY DONALD P. ECKMAN

Arthur H. Swanson
ATTORNEY.

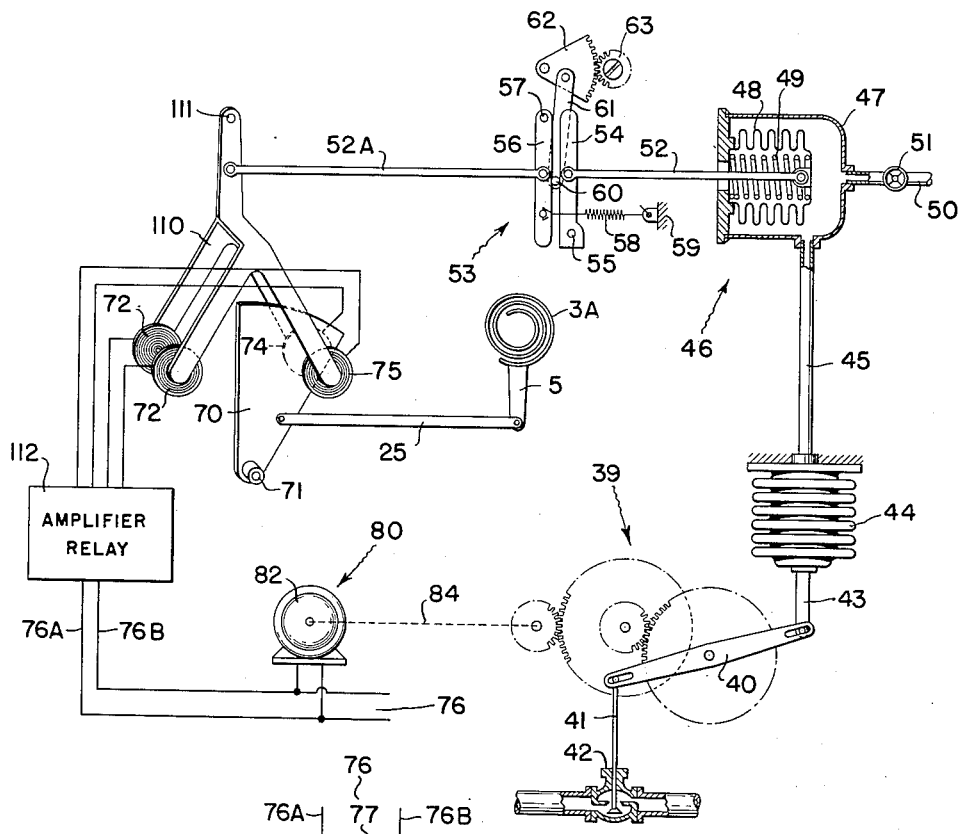

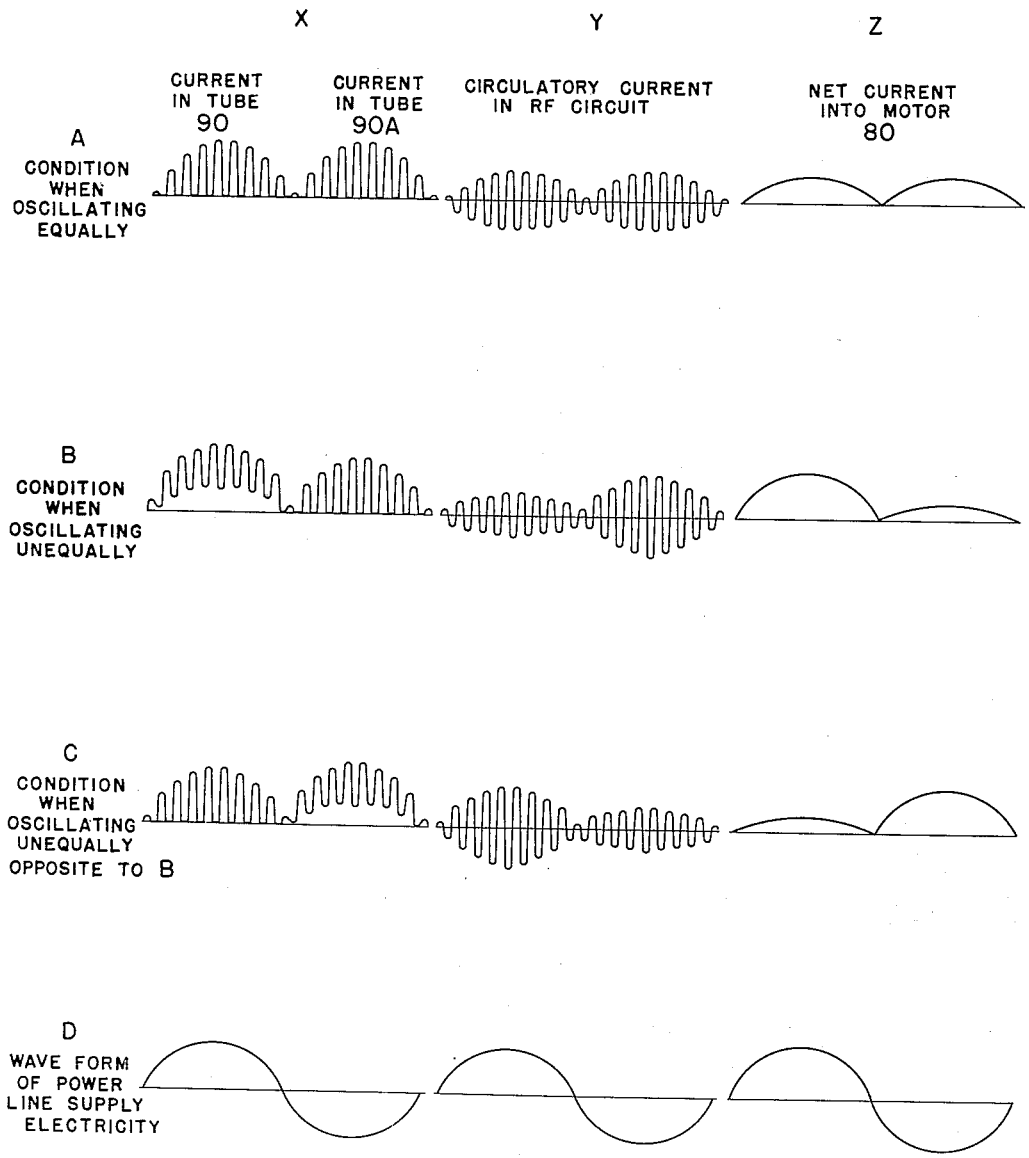

Patented Apr. 8, 1952

2,592,088

UNITED STATES PATENT OFFICE 2,592,088

ELECTRIC PROPORTIONING CONTROLLER WITH PNEUMATIC RESET

William H. Wannamaker, Jr., Flourtown, Pa., and Donald P. Eckman, Ithaca, N. Y., assignors, by mesne assignments, to Minneapolis-Honeywell Regulator Company, Minneapolis, Minn., a corporation of Delaware Application March 31, 1948, Serial No. 18,234

11 Claims. (Cl. 318—32)

All forms of automatic measuring means involve the final determination of minute amounts of energy. In consequence, the power afforded by such measuring or deviating means must be augmented to furnish sufficient power to operate indicating, recording or controlling devices.

The general object of the present invention is, therefore, to provide improvements in control instruments of the type including a measuring element deflecting in accordance with a measurable control quantity or quality, a proportional control system comprising an electrically operating system containing a control switch or a vane cooperating with a plurality of coils, and a device operated by air or other elastic fluid, said device being arranged to restore the electric switch or the vane and coils to a position proportional to the existing value as sensed by the measuring instrument.

It is a further object of this invention to provide a improved instrument adapted for a wide range of uses and having a measuring or deflecting element which may respond to, and, by its deflections furnish a measure of, changes in: pressure, temperature, electro-motive force, hydrogen ion concentration, or any other physical, electrical or chemical condition or quality, which, by its changes gives rise to variations in a measurable force, desirably resulting in control actions selectively dependent on such variations.

It is yet another object of this invention to provide a control instrument or system in which the measuring element can be made more sensitive even though it actuates a valve or other final control element because the electrically operated proportional control system is responsive to the measuring or deflecting element with a minimum interference with the movement of the measuring element and, at the same time, the air-operated follow-up system provides a maximum of accuracy and simplicity in its operations. There is thus provided an instrument which combines the advantages of electrical and of pneumatic operation. Among the advantages of electrical operation are: sensitivity and ability to readily and quickly transmit measurements to a distance. Among the advantages of pneumatic operation are: the ease and simplicity with which the reset mode of operation can be obtained. The reset mode of operation can only be had with electrical components with considerable complexity.

Still an additional object of this invention is to secure the advantages of a pneumatic transmission system even in places where there is no supply of compressed air or like gas. This is possible with the device of the present invention because the electrically operated transmission system drives an air pump which furnishes the movement of air for operating the pneumatic system.

The various features of novelty which characterize this invention are pointed out with particularity in the claims annexed to and forming part of this specification. For a better understanding of the invention, however, its advantages, and specific objects obtained with its use, reference should be had to the accompanying drawings and descriptive matter in which is diagrammatically illustrated and described various embodiments of this invention.

In the drawings,

Fig. 3 is a diagrammatic or schematic showing of a second modification.

Fig. 4 is an electric circuit diagram showing in detail the electric connections of the modification shown in Fig. 3.

Fig. 5 is a pictorial illustration of electric currents occurring in various parts of the device shown in Figs. 2, 3, and 4.

Figure 1:
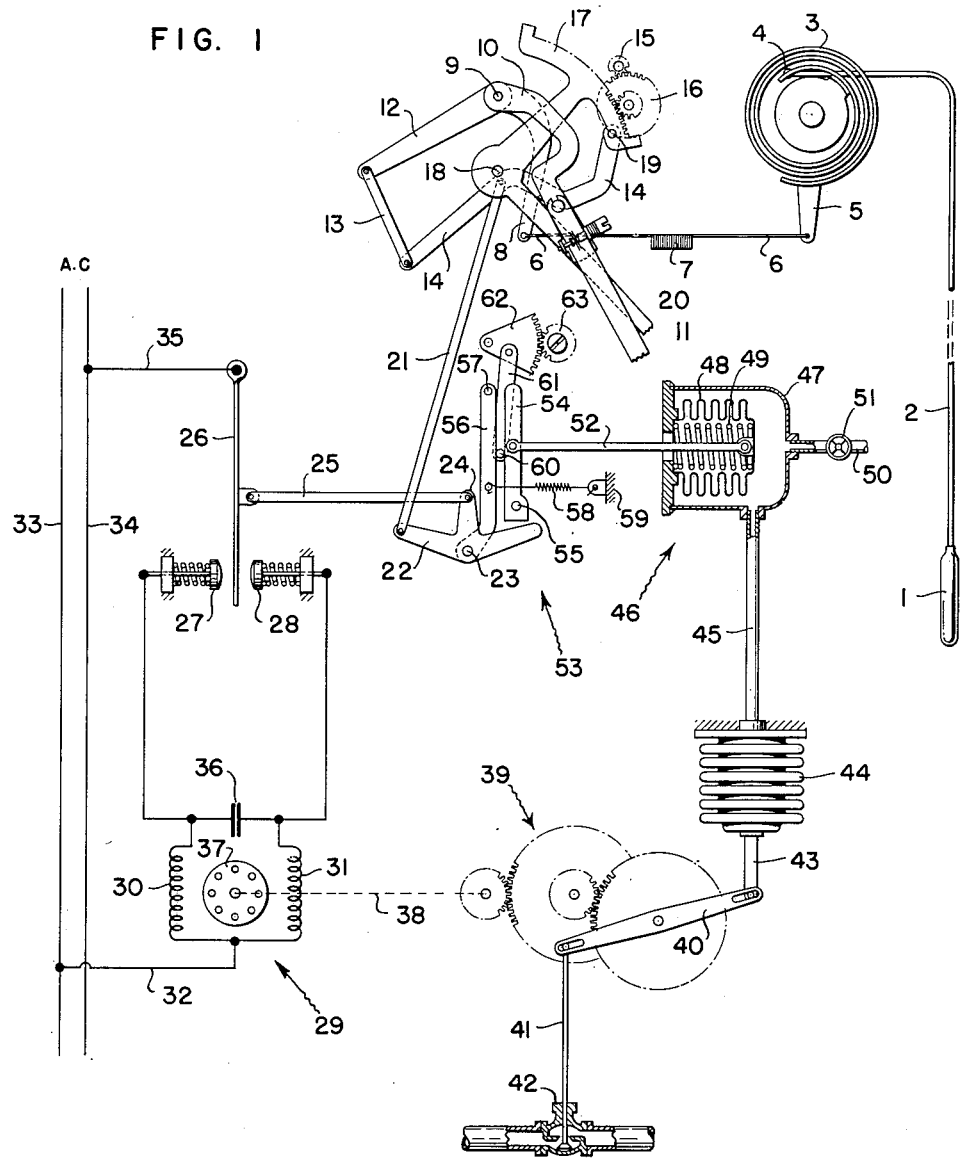
Fig. 1 is a semi-pictorial diagram showing the mechanical parts, some of which are broken away in cross section, and the electrical connections.

Referring to Fig. 1, there is disclosed one modification of this invention including a measuring or deflecting element, here shown as being a thermometer. This thermometer comprises a metal bulb 1 connected by capillary tubing 2 to a powerful, flat, spiral, actuating element 3. The bulb, the capillary tubing and the spiral are filled or partially filled with a liquid or gaseous actuating medium and are then sealed. The inner end 4 of the spiral 3 is fixed but the outer end is free to move in response to changes in temperature which create corresponding changes in the liquid or gaseous actuating medium. This movement of end 5 is transmitted by means of a safety link 6, which contains a helically coiled spring 7. The opposite end of the spring safety link 6 is pivotally connected to one end of a lever arm 8 which is fastened to a shaft or pin 9. Also fastened to shaft or pin 9 is an arm 10 which has pen arm 11 (broken away in Fig. 1) spring mounted thereon. Also fast on shaft or pin 9 is a differential arm 12 connecting pivotally with one end of a differential link 13 which is pivotally connected at the opposite end to a second differential arm 14. Handle 15 is pivotally mounted in the instrument casing or other convenient support (not shown) and has a geared portion forming part of a train of gearing 16, whose final gear meshes with a toothed gear sector 17 pivotally mounted on an axle 18. The opposite end of arm 14 is pivotally connected to sector 17 by a pin 19. Sector 17 also carries a set point indicator 20 on it. The end of set point indicator 20 is broken away in Fig. 1. Arm 14 has pivotally attached to its intermediate its ends, one end of a drive link 21 whose opposite end is pivotally secured to one arm 22 of a three armed lever pivotally mounted on pin 23. A second arm 24 of the three armed lever has pivotally secured to it one end of a second operating link 25.

A pivoted movable switch arm 26 has pivotally secured to it one end of link 25 so that the free end of switch arm 26 moves between relatively stationary contacts 27 and 28. Contacts 27 and 28 are connected to a motor, generally indicated at 29, and having a pair of coils 30 and 31. One end of each of coils 30 and 31 is connected by a common lead 32 to the alternating current supply line 33. The opposite alternating current supply line 34 is connected by lead 35 to movable switch arm 26. The opposite end of each of the coils 30 and 31 is connected to the other through a condenser 36. The motor 29 has a rotor 37 connected by a shaft 38 and a reduction gearing, generally indicated at 39, to an operating arm 40, one end of which has pivotally secured to it a valve rod 41 forming the operating member of the final control element, here illustrated as a valve 42.

The opposite end of arm 40 is pivotally connected to a rod 43 which operates a large air pump, shown as being a bellows 44, connected by a pipe 45 to an air-operated motor generally indicated at 46. Motor 46 comprises a solid casing 47 having secured thereto a flexible bellows 48 extended by a spring 49. Casing 47 has an exhaust pipe 50 communicating with it and controlled by a manually operable valve 51.

The free end of the motor bellows 48 has pivoted to it a link 52, which is pivoted at its opposite end to one arm 54 of a differential, generally indicated at 53. The opposite end of arm 54 is pivoted at 55. Differential 53 has another arm 56 which carries pin 23 at its free end and which is pivoted about a stationary axis 57. A spring 58 is secured at one end to arm 56 and is held stationary at its opposite end 59. Pin 60 forms a driving connection between the differential arms 54 and 56. Pin 60 is carried by arm 61 pivotally mounted on a sector 62 which may be turned by hand by means of a handle 63 having a gear wheel which meshes with teeth on the sector 62.

The operation of modification shown in Fig. 1 is as follows:

When the measuring element, represented by the thermometer bulb 1 and its associated mechanism, detects or senses a change in the condition, quality or quantity to which it is responsive, this change is transmitted by means of the movable end 5 of the spiral 3, and the connecting link 6, to the lever 8, which turns the shaft or pin 9, differential arm 12, differential link 13, and differential arm 14. This thereby raises or lowers the actuating link 21. This movement of link 21 turns arms 22 and 24 either clockwise or counter-clockwise about pivot 23 and therefore moves link 25 and consequently moves switch contact 26 into engagement with one or the other of the stationary switch contacts 27 or 28. Depending upon whether contact 26 engages stationary contact 27 or 28, rotor 37 of motor 29 rotates in one direction or the other. This turns shaft 38, reduction gearing 39, and consequently actuates the final control element (valve 42) in one direction or the other. Simultaneously, arm 40 expands or compresses bellows 44 and consequently there is a pressure existing within motor casing 47 and applied to motor bellows 48. The pressure within motor casing 47 equalizes with that of the atmosphere through pipe 50 at a rate depending upon the opening of valve 51. Movement of the free end of motor bellows 48 moves link 52, arms 54 and 56 of differential 53 and thus moves pivot 23 about stationary pivot 57. This movement of pivot 23 and consequently of the three armed lever moves link 25 and movable switch contact 26 to disengage contact 26 from either stationary contact 27 or 28 with which it is then engaged and to restore movable switch contact 26 to its intermediate position. This causes the rotation of motor 26 to cease.

Figure 2:
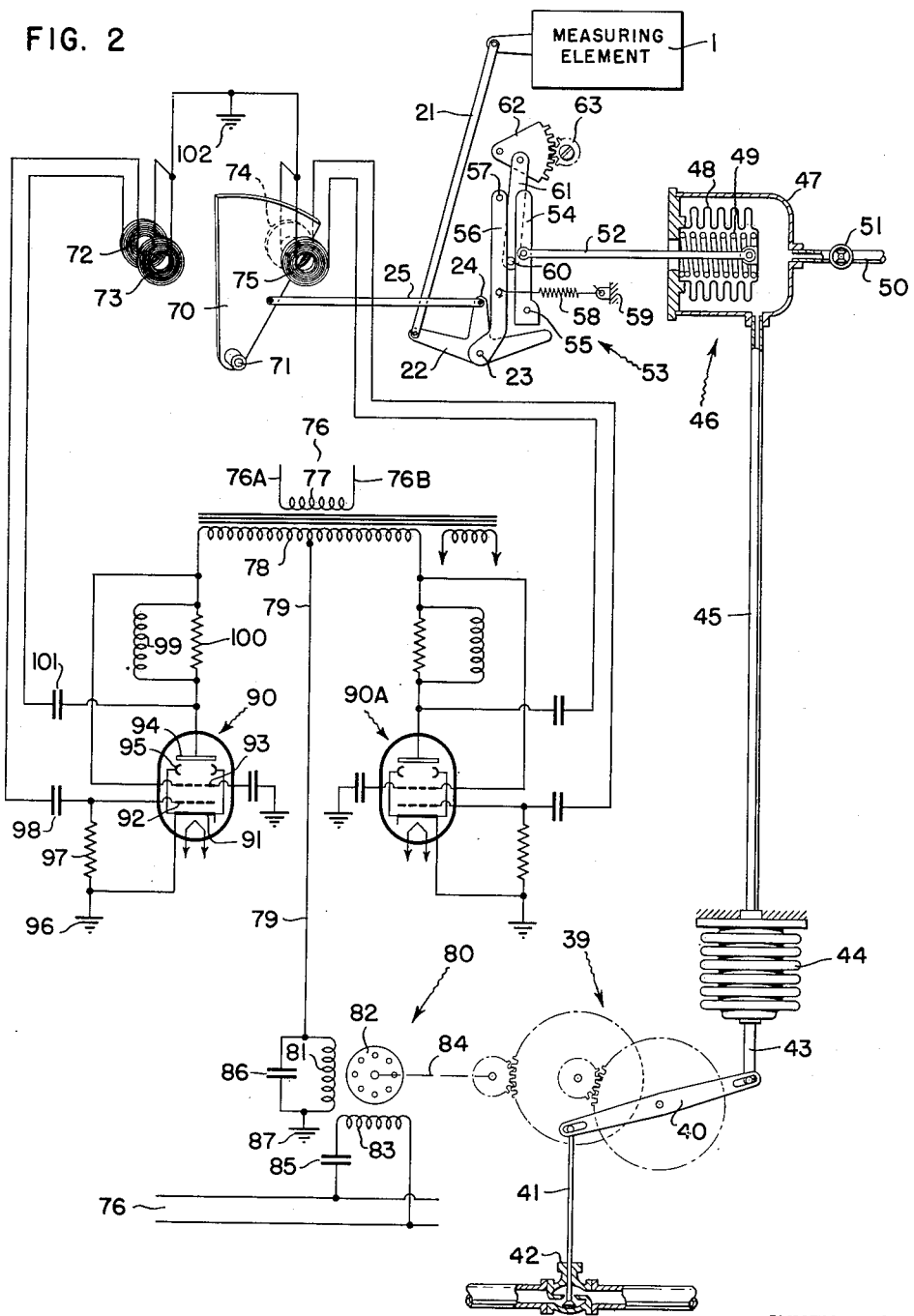
Fig. 2 shows in diagram the electrical and mechanical parts of a modification of this invention.

Referring now to the modification shown in Fig. 2, a measuring element 1 of any convenient type, such as the thermometer shown in Fig. 1, actuates link 21, lever arms 22 and 24 and connecting link 25. Link 25 has connected to its opposite end from arm 24 a vane 70 comprising a thin sheet of metal, such as copper or aluminum, strengthened by ribs if desired. Vane 70 is movable between pairs of coils 72, 73 and 74, 75. These coils are in the shape of flat spirals or pancakes. Each pair of coils is mounted coaxially and may be imbedded in resinous plastic material. This plastic material has a narrow kerf or opening into which the vane 70 may pass. An electric circuit capable of oscillation is supplied with power from a source of alternating current 76 which may conveniently be part of an ordinary electric household light or power system supplying current at about 115 volts and at a frequency of about 60 cycles per second.

The source 76 is connected to the primary 77 of a transformer having a secondary 78 which is connected by a mid tap 79 to one coil 81 of a motor, generally indicated at 80, having a rotor 82. The opposite motor coil 83 is connected in series with a condenser 85 across another source of alternating current 76. Motor coil 81 is connected in parallel with a condenser 86 to ground 87. In order to secure torque amplification, use is made of a dual electronic oscillator system, each oscillator functioning on opposite half waves of the power line supply in order not to affect the other. These oscillations each make use of a beam power tube or thermionic valve such as the commercially available type 6V6-G. A small plate-to-grid interelectrode capacity is assured so that positive control is placed at the coil in vane location. Since the two oscillator systems are duplicates but one will be described. The tube or valve generally indicated at 90, has a cathode 91, a control grid 92, a screen grid 93, an anode 94, a pair of beam-forming plates 95. The cathode 91 is rounded at 96 and is connected, by means of resistor 97, to the control grid 92 and by means of condenser 98, to the coil 73. One end of the transformer secondary 78 is connected to a branch connection. One branch contains coil 99 and resistor 100, in parallel and connects to anode 94 and, through condenser 101, to coil 72. The opposite side of coil 72 and of coil 73 is connected to each other and grounded at 102.

The other branch is connected to screen grid 93 which is grounded.

Detailed information as to the operation of the vane and coil oscillating circuit may be found in the William H. Wannamaker, Jr., application, Serial No. 541,576, filed June 22, 1944, now Patent 2,514,918. An alternative form of vane and coil circuit is shown in application Serial No. 694,401, filed August 31, 1941, also in the name of William H. Wannamaker, Jr.

Rotor 82 is connected by means of shaft 84 and speed reduction gearing 39 to arm 40. One end of arm 40 is pivotally connected to rod 41 which actuates the final control element 42 (herein indicated as a valve).

The opposite end of arm 40 is pivotally connected to a rod 43 which operates a large air pump, shown as being a bellows 44, connected by a pipe 45 to an air-operated motor, generally indicated at 46. Motor 46 comprises a solid casing 47 having secured thereto a flexible bellows 48 extended by a spring 49. Casing 47 has an exhaust pipe 50 communicating with it and controlled by a manually operable valve 51.

The free end of the motor bellows 48 has pivoted to its a link 52, which is pivoted at its opposite end to one arm 54 of a differential, generally indicated at 53. The opposite end of arm 54 is pivoted at 55. Differential 53 has another arm 6 which carries pin 23 at its free end and which is pivoted about a stationary axis 57. A spring 58 is secured at one end to arm 56 and is held stationary at its opposite end 59. Pin 60 forms a driving connection between the differential arms 54 and 56. Pin 60 is caried by arm 61 pivotally mounted on a sector 62, which may be turned by hand by means of a handle 63 having gear wheel which meshes with teeth on the sector 62.

The operation of modification shown in Fig. 2 is as follows:

A change sensed by the measuring element 1 moves the link 21 up or down. This rotates the three armed lever having arms 22 and 24 about its pivot 23 either in a clockwise or in a counter-clockwise direction. Link 25 moves vane 70 from an intermediate position away from one pair of coils 72, 73, for example, and towards the other pair of coils 74, 75, for example. When the metal vane 70 is interposed between two oscillator coils, the state of oscillation can be made to change or stop depending upon the position of the vane. This can be done by a movement of vane 70 of only 0.002 inch. This exceedingly small movement provides a very sensitive response to the measuring instrument but at the same time does not interfere with the movement of the measuring instrument since the only load imposed on the measuring instrument is that caused by the rotation of vane 70 about its pivot 71. The fundamental philosophy of this electrically operated control system is the fact that the direct current component of a thermionic tube may be made to change considerably in response to the change of state of oscillation of that tube as influenced by the coils connected to it. The grid of the tube draws very short pulses of current when the tube is oscillating vigorously. This results in a charge building up on an associated condenser. A shunt resistance forms an R-C network with a time constant sufficiently long so that the average potential across the condenser, and hence grid-to-cathode, becomes highly negative. Such a condition then results in a very low average plate current flow from the operating tube. When the tube is not oscillating, the grid will assume essentially zero bias and the plate circuit then draws a much larger current. Since the screen grid 93 is grounded, this change from a state of oscillation to a state of no oscillation occurs very rapidly and as a result of a very short movement of the vane 70. Therefore, the action of the device is independent of ordinary changes in load adjustment to a very great degree. The circuit is inappreciably affected by such factors as line voltage, tube aging, etc.

Since dual circuits are provided and since each circuit or tube operates on an opposite half-cycle of the power line supply wave, conditions, of operation as portrayed in Fig. 5 are secured. Fig. 5 D shows the wave form of the alternating current supply electricity. Referring to Fig. 5, A—X, the current in the tube 90 and the current in the tube 90A are shown. At Fig. 5, A—Y, the circulatory current in the R-F circuit is shown. Since each tube is passing current at net 120 cycle frequency (twice the power line frequency) or inverted power line frequency, direct current (D. C.) flows in the load (motor 80). This stops the rotation of motor armature 82. With the vane 70 in a slightly unsymmetrical position, the condition of the current in the tubes 90 and 90A is as shown in Fig. 5, B—X. As Fig. 5 shows, at B—Y, this results in unequal current flow in the R-F circuit. As Fig. 5 shows, at B—Z this results in unequal direct current flow through the load constituted by motor 80. Fig. 5, at C—X, Y and Z, shows the conditions when the vane 70 is moved in the opposite direction.

Figs. 3 and 4 exhibit a modification very similar to that disclosed in Fig. 2 except that the vane 70 is mounted for direct connection to the spiral measuring element 3A (shown as a bi-metallic thermostatic spiral coil having a free end 5). The coils 72, 73 and 74, 75 are not stationary as in Fig. 2 but are mounted by means of a frame 110 for movement about the pivot 111 in response to the action of the follow-up system. The amplifier relay (enclosed within the block 112 in Fig. 3) is disclosed in detail in Fig. 4. The leads 76A and 76B connect the source of alternating current 76 with the amplifier relay. The source 76 also supplies electricity to motor 80. The rotor 82 of motor 80 turns shaft 84 and in turn drives the follow-up system (shown in block 113 in Fig. 4) which moves the link 52A which, in turn, moves the support or frame 110 (shown in dotted lines in Fig. 4). In Fig. 4, the measuring instrument 3A actuates the link 25 (shown in dotted lines in Fig. 4) which in turn operates the vane 70 (shown in duplicate in Fig. 4 for convenience of illustration).

The operation of the modification shown in Fig. 3 is as described in connection with the operation and modification of the device shown in Fig. 2 except as follows:

The coils 72, 73 and 74, 75 are mounted for free movement by means of the follow-up system, which includes the pump or driving bellows 44, the air motor or driven bellows 46, the differential 53, and the driving link 52A. The vane 70 is moved only by the measuring element 3A and does not have the differential movement which is applied to the vane 70 in Fig. 2 and which results from the operation of the vane by the measuring element and by the follow-up system. Consequently, in the modification shown in Figs. 3 and 4, the measuring element 3A may have the maximum sensitivity since the only load imposed on the measuring element 3A is the rotation of the valve 70.

Having now described my invention, what we claim as new and desire to secure by Letters Patent is:

1. An electrical network including, a pair of terminals adapted to be connected to an alternating current supply source providing alternating current of predetermined frequency, a pair of electronic valves each having a normally equally conductive output circuit connected to said terminals in such a manner as to be connected in opposite phase relation to said alternating current supply source when said terminals are connected to a source of alternating current and each having an input circuit, a phase-responsive utilization circuit rendered operative when said output circuits are not equally conductive, a pair of oscillatory circuits each associated with one of said input circuits, said oscillatory circuits each including elements physically movable relatively to each other to vary the state of oscillation of said oscillatory circuit and thereby to vary the conductivity of one of said valves with respect to the conductivity of other of said valves, and means to adjust said oscillatory circuits.

2. An electrical network including, a pair of terminals adapted to be connected to an alternating current supply source providing alternating current of predetermined frequency, a pair of electronic valves each having a normally equally conductive output circuit connected to said terminals in such a manner as to be connected in opposite phase relation to said alternating current supply source when said terminals are connected to a source of alternating current and each having an input circuit, a phase-responsive utilization circuit rendered operative when said output circuits are not equally conductive, a pair of oscillatory circuits each associated with one of said input circuits to vary the relative conductivities of said valves, and means to adjust each of said adjustable oscillatory circuits.

3. A motor control circuit for use with an alternating current supply source providing alternating current of predetermined frequency, including, a pair of electronic valves having normally equally conductive output circuits connected in opposite phase relation to said alternating current supply source and including a common circuit portion and each having an input circuit, an oscillatory circuit associated with the input circuits of said valves to vary their relative conductivities, and an alternating current motor having a winding coupled to said common output circuit portion of said valves and a winding connected to said alternating current source.

4. A motor control circuit for use with an alternating current supply source providing alternating current of predetermined frequency, including, a pair of electronic valves having normally equally conductive output circuits connected in opposite phase relation to said alternating current supply source and including a common circuit portion and each having an input circuit, an oscillatory circuit associated with the input circuits of said valves, said oscillatory circuit including elements physically movable relatively to each other to vary the state of oscillation of said oscillatory circuit and thereby to vary their relative conductivities, and an alternating current motor having a winding coupled to said common output circuit portion of said valves and a winding connected to said alternating current source.

5. A motor control circuit for use with an alternating current supply source providing alternating current of predetermined frequency, including, a pair of electronic valves having normally equally conductive output circuits connected in opposite phase relation to said alternating current supply source and including a common circuit portion and each having an input circuit, an adjustable oscillatory circuit connected to the input circuit of each of said valves, means to adjust said adjustable oscillatory circuits to increase the conductivity of one of said valves above that of other of said valves, and an alternating current motor having a winding coupled to said common output circuit portion of said valves and a winding connected to said alternating current source.

6. A motor control circuit for use with an alternating current supply source providing alternating current of predetermined frequency, including, a pair of electronic valves having normally equally conductive output circuits connected in opposite phase relation to said alternating current supply source and each having an input circuit, an oscillatory circuit associated with the input circuits of said valves to vary their relative conductivities, an alternating current motor having a winding coupled to said common output circuit of said valves and a winding connected to said alternating current source so that said motor rotates in one direction or the other when one of said input circuits is rendered conductive, a pump driven by said motor to move air, and a follow-up bellows operated by the air moved by said pump and causing said input circuit which has been rendered conductive to become non-conductive.

7. A motor control circuit for use with an alternating current supply source providing alternating current of predetermined frequency, including, a pair of electronic valves having normally equally conductive output circuits connected in opposite phase relation to said alternating current supply source and each having an input circuit, an oscillatory circuit associated with the input circuits of said valves, said oscillatory circuit including elements physically movable relatively to each other to vary the state of oscillation of said oscillatory circuit and thereby to vary their relative conductivities, an alternating current motor having a winding coupled to said common output circuit of said valves and a winding connected to said alternating current source so that said motor rotates in one direction or the other when one of said input circuits is rendered conductive, and an air-power-operated follow-up circuit driven by said motor and controlling the state of oscillation of said oscillatory circuit.

8. A motor control circuit for use with an alternating current supply source providing alternating current of predetermined frequency, including, a pair of electronic valves having normally equaly conductive output circuits connected in opposite phase relation to said alternating current supply source and each having an input circuit, an adjustable oscillatory circuit connected to the input circuit of each of said valves, means to adjust said adjustable oscillatory circuits to increase the conductivity of one of said valves above that of other of said valves, an alternating current motor having a winding coupled to said common output circuits of said valves and a winding connected to said alternating current source so that said motor is energized when the conductivity of one of said valves is above that of the other, a pneumatic transmitter driven by said motor to change an air pressure, a pneumatic receiver connected by piping to said transmitter so as to be actuated by the change in air pressure from said transmiter, and a mechanical connection driven by said receiver and causing variation in said means to adjust said adjustable oscillatory circuits to vary the state of oscillation of said oscillatory circuits in a direction to deenergize said motor.

9. A motor control circuit including, a pair of terminals adapted to be connected to an alternating current supply source providing alternating current of predetermined frequency, a pair of electronic valves each having a normally equally conductive output circuit connected to said terminals in such a manner as to be connected in opposite phase relation to said alternating current supply source when said terminals are connected to a source of alternating current and each having an input circuit, a phase-responsive utilization circuit rendered operative when said output circuits are not equally conductive, a pair of oscillatory circuits each associated with one of said input circuits, said oscillatory circuits each including elements physically movable relatively to each other to vary the state of oscillation of said oscillatory circuit from its norm and thereby to vary the conductivity of one of said valves with respect to the conductivity of other of said valves, means to adjust one of said movable elements, and an elastic-fluid-operated follow-up element operated by said utilization circuit to move said one of said movable elements in such a manner as to restore the state of oscilation of said oscillatory circuit to its norm.

10. A motor control circuit including, a pair of terminals adapted to be connected to an alternating current supply source providing alternating current of predetermined frequency, a pair of electronic valves each having a normally equally conductive output circuit connected to said terminals in such a manner as to be connected in opposite phase relation to said alternating current supply source when said terminals are connected to a source of alternating current and each having an input circuit, a phase-responsive utilization circuit rendered operative when said output circuits are not equally conductive, a pair of oscillatory circuits each having a norm and each associated with one of said input circuits to vary the relative conductivities of said valves, means to adjust each of said adjustable oscillatory circuits from its norm, and an elastic-fluid-operated follow-up mechanism operated by said utilization circuit upon operation thereof to move said means to said oscillatory circuits to adjust said oscillatory circuit to its norm.

11. An industrial controller having a final control element following the movements of a measuring instrument, inculding, a vane, a plurality of coils mounted adjacent said vane, means operable by said measuring instrument for causing relative movement between said vane and said coils to vary the inductance of said coils, a pair of oscillatory electric circuits each connected to a source of alternating current electricity, each oscillatory circuit operating on opposite half-waves of the alternating current in order not to affect each other and connected to said coils so as to oscillate or cease oscillating in response to the changes in the inductance of said coils, a mechanical differential having its output member connected to cause relative movement between said vane and said coils, a set point indicator mechanically connected to said differential and manually movable to cause relative movement between said vane and said coils to a point corresponding to a value within the range of said measuring instrument to which point it is desired to have the quantity or quality being measured maintained, an air pump driven by said electric motor to move air, and a follow-up bellows operated by the air moved by said pump and forming one input to one differential to cause relative movement between said vane and said coils to restore the inductance of said coils to that value existing prior to the relative movement between said vane and said coils in response to the measuring element.

WILLIAM H. WANNAMAKER, JR.
DONALD P. ECKMAN.

REFERENCES CITED

The following references are of record in the file of this patent:

UNITED STATES PATENTS

| Number | Name | Date |
|---|---|---|
| 1,838,084 | Drake | Dec. 29, 1931 |
| 2,154,260 | Brandenburger | Apr. 11, 1939 |
| 2,325,103 | Bristol | July 27, 1943 |
| 2,335,943 | Jones | Dec. 7, 1943 |
| 2,364,483 | Side | Dec. 5, 1944 |
| 2,386,942 | Edelman | Oct. 16, 1945 |
| 2,414,314 | Machlet | Jan. 14, 1947 |
| 2,473,494 | Wannamaker | June 14, 1949 |
| 2,514,918 | Wannamaker | July 11, 1950 |

FOREIGN PATENTS

| Number | Country | Date |
|---|---|---|
| 750,075 | France | Aug. 3, 1933 |